United States Patent [19]

Arai et al.

[11] Patent Number: 5,514,741
[45] Date of Patent: May 7, 1996

[54] ROOM TEMPERATURE CURABLE ORGANOPOLYSILOXANE COMPOSITION

[75] Inventors: Masatoshi Arai; Kei Miyoshi; Shinichi Sato, all of Matsuida, Japan

[73] Assignee: Shin-Etsu Chemical Co., Ltd., Tokyo, Japan

[21] Appl. No.: 337,440

[22] Filed: Nov. 8, 1994

[30] Foreign Application Priority Data

Nov. 8, 1993 [JP] Japan .................................. 5-302340

[51] Int. Cl.$^6$ .................................................. C08K 3/10
[52] U.S. Cl. .......................... 524/437; 524/588; 524/786; 524/863; 528/34; 528/42; 528/35; 528/36
[58] Field of Search ............................. 528/34, 42, 35, 528/36; 524/588, 437, 786, 863

[56] References Cited

U.S. PATENT DOCUMENTS 5,314,981  5/1994  Takago et al. ............................ 528/36

Primary Examiner—David Buttner
Assistant Examiner—Margaret Glass
Attorney, Agent, or Firm—Oblon, Spivak, McClelland, Maier & Neustadt

[57] ABSTRACT

A condensation curing type room temperature curable organopolysiloxane composition, comprising (A) a diorganopolysiloxane the both ends of the molecular chain of which are terminated with a hydroxyl group, (B) an organosilicon compound containing at least three hydrolyzable groups bonded to a silicon atom in the molecule or its partial hydrolysis-condensation product, (C) an alkoxysilane having a fluorine-containing organic group, and (D) aluminum hydroxide. This composition can form a cured product excellent in soil resistance and can keep favorably the tracking resistance for a long period of time. Particularly, the composition is quite useful as a protective coating material for high voltage power supply parts used outdoors.

5 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curable organopolysiloxane composition that is curable easily by the action of moisture, and more particularly to a room temperature curable organopolysiloxane composition that is suitably used as a protective coating material for high-voltage power supply parts that are used outdoors, such as insulators.

2. Description of the Prior Art

Conventionally, for high-voltage insulators, glass, ceramics, and the like are used. However, as the voltage to be insulated becomes higher, the conventional insulators sometimes fail to insulate the voltage, for example, due to a change in weather or soil, and such a problem is conspicuous particularly where they are used outdoors.

To cope with this, it is known to apply a silicone grease onto the surface of the insulator to obviate effectively the leakage of the electric current. However, even in this case, since the greased surface becomes soiled with the passage of time, it is the present condition that the greased surface has to be cleaned within about two years or the surface has to be regreased.

Although it is suggested to apply a room temperature silicone rubber in place of the above silicone grease, the room temperature silicone rubber is not practically used because of the problems that soil on the rubber surface results in tracking and the removal of the rubber is difficult in comparison with the grease.

However, taking particularly the outdoor use into consideration, if the problem of soil on the surface is only solved, it is desirable to use rubber because rubber does not come off even under various weather conditions in comparison with grease and is therefore high in safety.

SUMMARY OF THE INVENTION

Therefore, an object of the present invention is to provide a room temperature curable organopolysiloxane composition that can form a cured product good in soil resistance and excellent in tracking resistance.

According to the present invention, there is provided a room temperature curable organopolysiloxane composition, comprising (A) a diorganopolysiloxane the both ends of the molecular chain of which are terminated with a hydroxyl group, (B) an organosilicon compound containing at least three hydrolyzable groups bonded to a silicon atom in the molecule or its partial hydrolysis-condensation product, (C) an alkoxysilane represented by the following general formula (1):

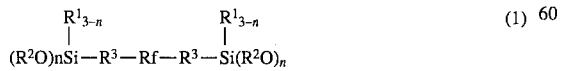

wherein $R^1$ and $R^2$, which are the same or different, each represent an unsubstituted or substituted monovalent hydrocarbon group having 1 to 8 carbon atoms, $R^3$ represents a bivalent hydrocarbon group or a bivalent group represented by the formula:

$$-R^4OR^5- \text{ or } -R^4CONHR^5-$$

wherein $R^4$ and $R^5$ each represent a bivalent hydrocarbon group, Rf represents a bivalent perfluoroalkylene group or a bivalent perfluoropolyether group, and n is an integer of 1 to 3, and (D) aluminum hydroxide.

DETAILED DESCRIPTION OF PREFERRED EMBODIMENTS

An important feature in the present invention is that the component (C), an alkoxysilane represented by the above general formula (1), is blended and due to this the soil resistance and the tracking resistance of the cured product formed from the present composition have successively been improved. That is, in the present composition, the above component (C) is distributed preferentially on the surface of the cured product, and due to the action of the fluorine-containing group in said component the surface of the cured product or its surroundings are effectively restrained from being soiled and thereby the tracking resistance is improved.

According to the present invention, an organopolysiloxane composition of a room temperature curable type can be provided that can form a cured product which is excellent in soil resistance and keeps favorably the tracking resistance for a long period of time. This composition is quite useful as a protective coating material particularly for high-voltage power supply parts that are used outdoors.

Component (A)

The component (A), a diorganopolysiloxane, is a base component of the present composition and it is required that the both ends of its molecular chain are terminated with a hydroxyl group. That is, this hydroxyl group at the both ends is condensed with the hydrolyzable group in the component (B) described later in the presence of moisture, leading to the formation of a rubberlike elastic cured product.

Such a diorganopolysiloxane is represented, for example, by the following general formula (2):

wherein $R^6$ and $R^7$, which are the same or different, each represent an unsubstituted or substituted monovalent hydrocarbon group and p is a positive integer.

Suitable examples of the monovalent hydrocarbon group represented by $R^6$ and $R^7$ in the above general formula (2) include an alkyl group, such as a methyl group, an ethyl group, a propyl group, and a butyl group, a cycloalkyl group, such as a cyclohexyl group, an alkenyl group, such as a vinyl group and an allyl group, an aryl group, such as a phenyl group and a tolyl group, and an aralkyl group, such as a benzyl group and a phenylethyl group, and corresponding substituted groups that are formed by replacing at least part of the hydrogen atoms of the above hydrocarbon groups by a halogen atom or the like, such as a chloromethyl group and a 3,3,3-trifluoropropyl group.

Further, preferably the diorganopolysiloxane has a viscosity at 25° C. in the range of 25 to 500,000 cSt, and particularly 1,000 and 100,000 cSt, and therefore preferably p in the above formula is generally an integer of 10 or more, preferably 10 to 2,000.

Component (B)

The component (B), an organosilicon compound, is a crosslinking agent and is an essential component so that the composition of the present invention may be cured at room temperature in the presence of moisture to form a rubberlike elastic cured product. That is, this organosilicon compound has at least three hydrolyzable groups and when the hydrolyzable groups come in contact with moisture, the hydrolyzable groups are hydrolyzed and are condensed with the end hydroxyl groups in the component (A), leading to the formation of a rubberlike elastic cured product. The organosilicon compound or the partial-hydrolysis condensation product includes, for example, the compounds having the formula:

$$R^8{}_a SiO_{(4-a)/2}$$

containing residual hydrolyzable groups wherein $R^8$ has the same meaning as $R^6$ in the formula (2) and a is a number of 0 to 1.

The hydrolyzable group includes, but is not limited to, for example, an alkoxy group, a ketoxime group, an acyloxy group, an amido group, an amino group, an aminoxy group, and an alkenoxy group. This organosilicon compound may be a silane compound or a siloxane compound having a Si—O—Si bond in the molecule. Specific examples are an alkoxysilane, such as methyltrimethoxysilane, vinyltriethoxysilane, 3-chloropropyltrimethoxysilane, and 3-aminopropyltriethoxysilane; a ketoximesilane, such as methyltris (dimethylketoxime) silane, methyltris (methylethylketoxime)silane, vinyltris (methylethylketoxime) silane, and tetra (methylethylketoxime) silane; an acyloxysilane, such as vinyltriacetoxysilane, methyltriacetoxysilane, and phenyltriacetoxysilane; an amidosilane, such as phenyltris (N-methylacetamido) silane and vinyltris (N-methylacetamido)silane; an aminosilane, such as vinyltris (N-butylamino)silane and phenyltris (N,N-diethylamino) silane; an aminoxysilane, such as methyltris (N,N-dimethylaminoxy) silane and vinyltris (N,N-diethylaminoxy) silane; and an alkenoxysilane, such as vinyltriisopropenoxysilane, methyltriisobutenoxysilane, and phenyltricyclohexanoxysilane; and a mixture of two or more partial hydrolysis-condensation products of these.

Generally the component (B) is blended in an amount of 0.5 to 30 part by weight, and particularly 3 to 20 parts by weight, per 100 parts by weight of the component (A). If the amount is less than 0.5 part by weight, there is a fear that a gel is formed when the composition is produced or during the storage of the composition or that the obtained cured product fails to exhibit the intended physical properties. If the amount to be used is more than 30 parts by weight, the shrinkage at the time of the curing of the composition becomes large and the elasticity of the obtained cured product is also apt to lower.

Component (C)

The component (C) is an alkoxysilane having a fluorine-containing group represented by the above formula (1) and as described above the component (C) is distributed preferentially on the surface of the cured product to render the cured product resistant to soil and to improve the tracking resistance.

In the general formula (1), $R^1$ and $R^2$ each represent a monovalent hydrocarbon group having 1 to 8 carbon atoms and typical examples thereof include an alkyl group, such as a methyl group, an ethyl group, a propyl group, and a butyl group; a cycloalkyl group, such as a cyclohexyl group; an alkenyl group, such as a vinyl group and an allyl group; an aryl group, such as a phenyl group and a tolyl group; and an aralkyl group, such as a benzyl group and a phenylethyl group; and corresponding substituted groups that are formed by replacing at least part of the hydrogen atoms of the above hydrocarbon groups by a halogen atom or the like, such as a chloromethyl group and a 3,3,3-trifluoropropyl group.

$R^3$ is a bivalent hydrocarbon group, for example, an alkylene group, such as, a methylene group, an ethylene group, and a propylene group, a cycloalkylene group, such as a cyclopentylene group and a cyclohexylene group, an arylene group, such as a phenylene group, or a bivalent group represented by the formula:

$$-R^4OR^5- \text{ or } -R^4CONHR^5-$$

wherein $R^4$ and $R^5$ each represent a bivalent hydrocarbon group. Specific examples of $R^4$ and $R^5$ in the above formula include the bivalent hydrocarbon groups exemplified above for $R^3$.

Further, Rf is a bivalent perfluoroalkylene group or a bivalent perfluoropolyether group. An example of the bivalent perfluoroalkylene group is a bivalent perfluoroalkylene group represented by the following formula:

$$-C_qF_{2q}-$$

wherein q is an integer of 1 to 10. Further, an example of the bivalent perfluoropolyether group is a bivalent perfluoropolyether group represented by the following formula:

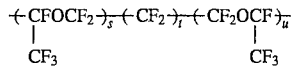

wherein s and u are each an integer of 1 to 8 and t is an integer of 0 to 6.

Specific examples of the alkoxysilane represented by the above general formula (1) include, but are not limited to, the following:

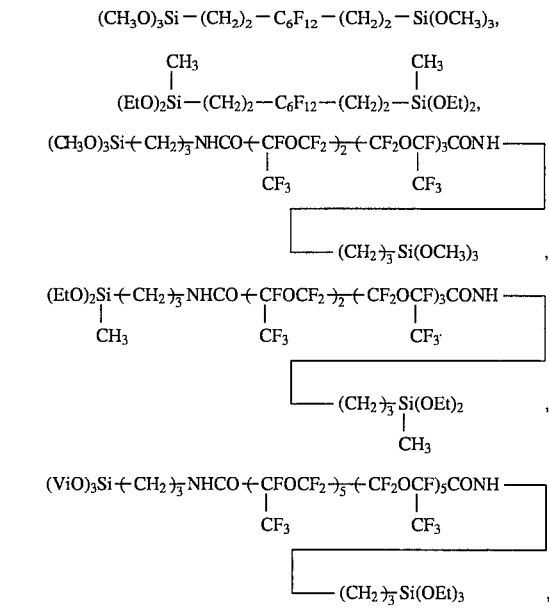

-continued

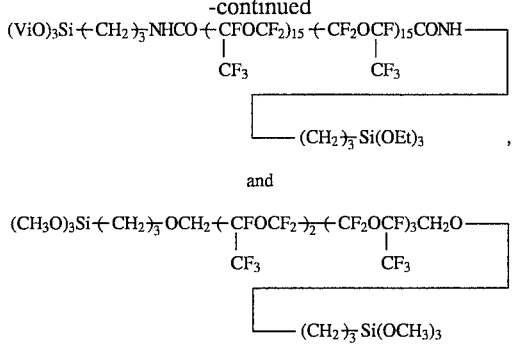

wherein Et represents an ethyl group and Vi represents a vinyl group.

In the present invention, the component (C) is generally blended in an amount of 0.1 to 15 parts by weight, and particularly 0.5 to 5 parts by weight, per 100 parts by weight of the component (A). If the amount is less than 0.1 part by weight, an enough amount of the component (C) is not distributed on the surface of the cured product and there is a fear that the tracking resistance becomes unsatisfactory. If the amount to be used exceeds 15 parts by weight, not only it causes the physical properties of the cured product to be lowered but also there is a tendency that it becomes disadvantageously uneconomical.

Component (D)

The component (D), aluminum hydroxide, is a filler known as a tracking resistance improver for a cured product. The component (D) is blended generally in an amount of 20 to 200 parts by weight, and particularly 30 to 150 parts by weight, per 100 parts by weight of the component (A). If the amount is less than 20 parts by weight, the tracking resistance of the cured product becomes unsatisfactory and if the amount to be used exceeds 200 parts by weight, in some cases, such problems arise that the mechanical properties of the cured product are lowered and the workability of the composition is lowered.

The curable composition

The present composition is obtained as a one-pack type room temperature curable composition by blending uniformly prescribed amounts of the above components (A) to (D) in a dry atmosphere. In this case, the present composition may be made into a two-pack type composition in such a manner that the component (B) is packed separately from the uniform mixture of the other components so that the component (B) may be mixed with the mixture when used.

Unless the curability at room temperature, the tracking resistance of the cured product, and the like are not adversely affected, various ingredients known per se can be added. Specifically, for example, a known catalyst for accelerating the condensation curing reaction, such as various amine compounds, quaternary ammonium salts, organotin esters, organotin chelate complexes, organic titanates, organotitanium chelate complexes, and guanidyl-group-containing compounds, e.g., tetramethylguanidylpropyltrimethoxysilane, and tetramethylguanidylpropyltrismethylsiloxysilane, can be added, and further in order to adjust the physical properties of the intended rubberlike elastic cured product, a reinforcing filler, such as fumed silica, precipitated silica, titanium dioxide, aluminum oxide, quartz powder, carbon powder, talc, and bentonite; a basic filler, such as calcium carbonate, zinc carbonate, zinc oxide, and magnesium carbonate; a fibrous filler, such as asbestos, glass fiber, carbon fiber, and organic fiber; a colorant, such as a pigment and a dye; a heat resistant improver, such as red iron oxide and cerium oxide; a cold resistance improver; a rust preventive; an oil resistance improver, such as potassium methacrylate; a thixotropic agent, such as a polyether; and an adhesion improver, such as $\gamma$-aminopropyltriethoxysilane and $\gamma$-glycidoxypropyltriethoxysilane can be added in prescribed amounts if required.

The composition of the present invention is cured in the presence of moisture in the air to form a cured product excellent in soil resistance and good in tracking resistance. Therefore, the composition of the present invention is quite useful as a protective coating material for high-voltage power supply parts used outdoors, such as insulators.

EXAMPLES

In the following examples, all the parts quoted represent parts by weight and the viscosity was measured at 25° C.

Comparative Example 1

100 parts of a dimethylpolysiloxane the both ends of the molecular chain of which were terminated with a hydroxyl group (viscosity: 20,000 cSt), 100 parts of aluminum hydroxide, and 1.5 parts of titanium oxide were mixed, and after the resulting mixture was passed through a three-roll mill once, 7 parts of methyltributanoximesilane and 0.1 part of dibutyltin dioctoate were mixed with the mixture in the absence of water with the air being removed to prepare a room temperature curable composition.

The composition was cured and molded into a 5×120×120 cm sheet and the tracking resistance of the cured molded product at the initial stage was measured in accordance with a method stipulated in the DIN KA method. Also, after the cured molded product was exposed outdoors for two years in Annaka-city, Gumma-prefecture, the tracking resistance was measured in the same way as above. The results are shown in Table 1. The conditions of the measurement were as follows:

The solution: an aqueous solution containing 0.1% of ammonium chloride and 0.5% of sodium n-butylnaphthalenesulfonate (electrical conductance: 4.57).

The voltage: 380 V.

The dropping rate: one drop/30 sec (101 drops were dropped).

The distance between the electrodes: 4 mm.

Judgment: when a current of 0.5 A was passed for 2 sec, it was judged that tracking took place, and the evaluation was made in terms of the number of dropped drops of the solution.

EXAMPLES 1 TO 3

To the composition prepared in Comparative Example 1, a perfluoropolyethersilane represented by the following formula:

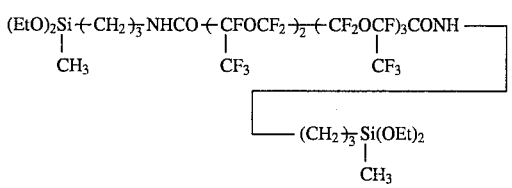

(corresponding to the component (C)) was added in amounts of 1.0 part, 3.0 parts, and 5.0 parts in respective Examples, thereby preparing curable compositions. Similarly to Comparative Example 1, from each of these compositions, a cured molded product was formed and the tracking resistance at the initial stage and after outdoor exposure for 2 years was evaluated. The results are shown in Table 1.

TABLE 1

| Component (C) in the composition | Comparative Example 1 0 | Example 1 1.0 part | Example 2 3.0 parts | Example 3 5.0 parts |
|---|---|---|---|---|
| Tracking resistance | | | | |
| At the initial stage | 101 < | 101 < | 101 < | 101 < |
| After exposure | 80 | 101 < | 101 < | 101 < |

Comparative Example 2

100 parts of a dimethylpolysiloxane the both ends of the molecular chain of which were terminated with a hydroxyl group (viscosity: 20,000 cSt), 100 parts of aluminum hydroxide, and 1.5 parts of titanium oxide were mixed, and after the resulting mixture was passed through a three-roll mill once, 6 parts of vinyltriisopropenoxysilane and 0.5 part of quanidyl-containing silane represented by the following formula:

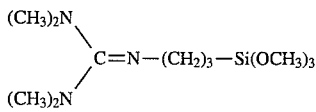

were mixed with the mixture in the absence of water with the air being removed to prepare a room temperature curable composition.

Similarly to Comparative Example 1, from this composition, a cured molded product was formed and the tracking resistance at the initial stage and after outdoor exposure for 2 years was evaluated. The results are shown in Table 2.

EXAMPLES 4 TO 6

To the composition prepared in Comparative Example 2, a perfluoropolyethersilane represented by the following formula:

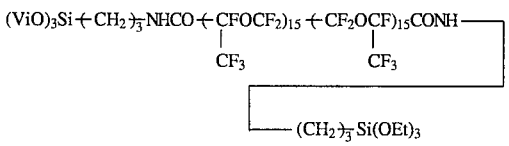

wherein Et represents an ethyl group and Vi represents a vinyl group (corresponding to the component (C)) was added in amounts of 1.0 part, 3.0 parts, and 5.0 parts in respective Examples, thereby preparing curable compositions. Similarly to Comparative Example 1, from each of these compositions, a cured molded product was formed and the tracking resistance at the initial stage and after outdoor exposure for 2 years was evaluated. The results are shown in Table 2.

TABLE 2

| Component (C) in the composition | Comparative Example 2 0 | Example 4 1.0 part | Example 5 3.0 parts | Example 5 5.0 parts |
|---|---|---|---|---|
| Tracking resistance | | | | |
| At the initial stage | 101 < | 101 < | 101 < | 101 < |
| After exposure | 90 | 101 < | 101 < | 101 < |

What is claimed is:

1. A room temperature curable organopolysiloxane composition, comprising
   (A) a diorganopolysiloxane having hydroxyl groups at both ends of the molecular chain,
   (B) 0.5 to 30 parts by weight per 100 parts by weight of component (A) of an organosilicon compound containing at least three hydrolyzable groups bonded to a silicon atom in the molecule or its partial hydrolysis-condensation product,
   (C) 1 to 5 parts by weight per 100 parts by weight of component (A) of an alkoxysilane represented by the following general formula (1):

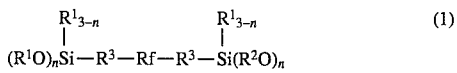

wherein $R^1$ and $R^2$, which are the same or different, each represent an unsubstituted monovalent hydrocarbon group having 1 to 8 carbon atoms or said hydrocarbon group having at least part of the hydrogen atoms replaced by halogen atoms, $R^3$ represents a bivalent hydrocarbon group or a bivalent group represent by the formula:

$$-R^4OR^5- \text{ or } -R^4CONHR^5-$$

wherein $R^4$ and $R^5$ each represent a bivalent hydrocarbon group, Rf represents a bivalent perfluoroalkylene group or a bivalent perfluoropolyether group, and n is an integer of 1 to 3, and
   (D) 30 to 150 parts by weight per 100 parts by weight of component (A) of aluminum hydroxide.

2. The composition of claim 1, wherein the diorganopolysiloxane of the component (A) is represented by the general formula (2);

wherein $R^6$ and $R^7$, which are the same or different, each represent an unsubstituted monovalent hydrocarbon group or said hydrocarbon group having at least part of the hydrogen atoms replaced by halogen atoms, and p is a positive integer.

3. The composition of claim 1, wherein the partial hydrolysis-condensation product of the component (B) is represented by the formula:

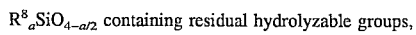

wherein $R^8$ is an unsubstituted monovalent hydrocarbon group or said hydrocarbon group having at least part of the hydrogen atoms replaced by halogen atoms, and a is a number of 0 to 1.

4. The composition of claim 1, wherein in the general formula (1) $R^1$ and $R^2$ are different or the same and each represent an alkyl group, cycloalkyl group, alkenyl group, aryl group, aralkyl group or a corresponding substituted group that is formed by replacing at least part of the hydrogen atoms of said groups defining $R^1$ and $R^2$ by a halogen atom; $R^3$ represents an alkylene group, cycloalkylene group, arylene group or a divalent group having $-R^4OR^5-$ or $-R^4CONHR^5-$ where $R^4$ and $R^5$ each stands for an alkylene group, cycloalkylene group or arylene group; and $R^f$ represents $$-C_qF_{2q}-$$

where q is an integer of 1 to 10, or

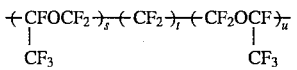

where s and u each stands for an integer of 1 to 8 and t is an integer of 0 to 6.

5. A cured product obtained by curing the composition of claim 1.

* * * * *